United States Patent
Bui et al.

(10) Patent No.: US 12,222,828 B2
(45) Date of Patent: Feb. 11, 2025

(54) SHARE-BASED REPLICATION

(71) Applicant: Snowflake Inc., Bozeman, MT (US)

(72) Inventors: Loc Duc Bui, Bellevue, WA (US);
Hitesh Madan, Seattle, WA (US);
Nithin Mahesh, Kirkland, WA (US);
Subramanian Muralidhar, Mercer Island, WA (US); Sahaj Saini, Seattle, WA (US); Di Wu, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 67 days.

(21) Appl. No.: 18/329,348

(22) Filed: Jun. 5, 2023

(65) Prior Publication Data
US 2024/0176711 A1    May 30, 2024

Related U.S. Application Data

(60) Provisional application No. 63/385,514, filed on Nov. 30, 2022.

(51) Int. Cl.
   *G06F 16/25*    (2019.01)
   *G06F 11/20*    (2006.01)
   *G06F 16/27*    (2019.01)

(52) U.S. Cl.
   CPC .......... *G06F 11/203* (2013.01); *G06F 16/256* (2019.01); *G06F 16/27* (2019.01)

(58) Field of Classification Search
   CPC ....... G06F 11/203; G06F 16/27; G06F 16/256
   USPC ......................................................... 707/635
   See application file for complete search history.

(56) References Cited

U.S. PATENT DOCUMENTS

| | | | |
|---|---|---|---|
| 2010/0057745 A1* | 3/2010 | Li | G06F 16/256 707/E17.032 |
| 2010/0082538 A1* | 4/2010 | Rentsch | G06F 16/24539 707/E17.001 |

* cited by examiner

*Primary Examiner* — Joshua Bullock
(74) *Attorney, Agent, or Firm* — SCHWEGMAN LUNDBERG & WOESSNER, P.A.

(57) ABSTRACT

The subject technology determines a set of share objects in a replication group. The subject technology, for each object from the set of share objects, determines a set of permissions for a set of objects of databases that has been granted to each share object from the replication group. The subject technology, for each permission from the set of permissions, determines a set of dependencies, the set of dependencies comprising a second set of objects. The subject technology generates a graph structure based at least in part on the set of share objects, the set of permissions, and the set of dependencies. The subject technology traverses at least a portion of the graph structure to determine a final set of dependencies for replication. The subject technology performs a replication process based at least in part on the final set of dependencies.

30 Claims, 11 Drawing Sheets

SHARE-BASED REPLICATION

CROSS-REFERENCE TO RELATED APPLICATIONS

This application claims priority to U.S. Provisional Patent Application Ser. No. 63/385,514, filed Nov. 30, 2022, entitled "SHARE-BASED REPLICATION," and the contents of which are incorporated herein by reference in its entirety for all purposes.

TECHNICAL FIELD

Embodiments of the disclosure relate generally to a network-based database system or a cloud data platform and, more specifically, to processing operations for replication of portions of a given database including systems, methods, and devices for database replication.

BACKGROUND

Databases are widely used for data storage and access in computing applications. Databases may include tables having rows and columns that include or reference data that can be read, modified, or deleted using queries.

In some instances, it may be beneficial to replicate database data in multiple locations or on multiple storage devices. Replicating data can safeguard against system failures that may render data inaccessible over a cloud network or may cause data to be lost or permanently unreadable. However, data replication across a network comprising various regions can induce latency as well as cost.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
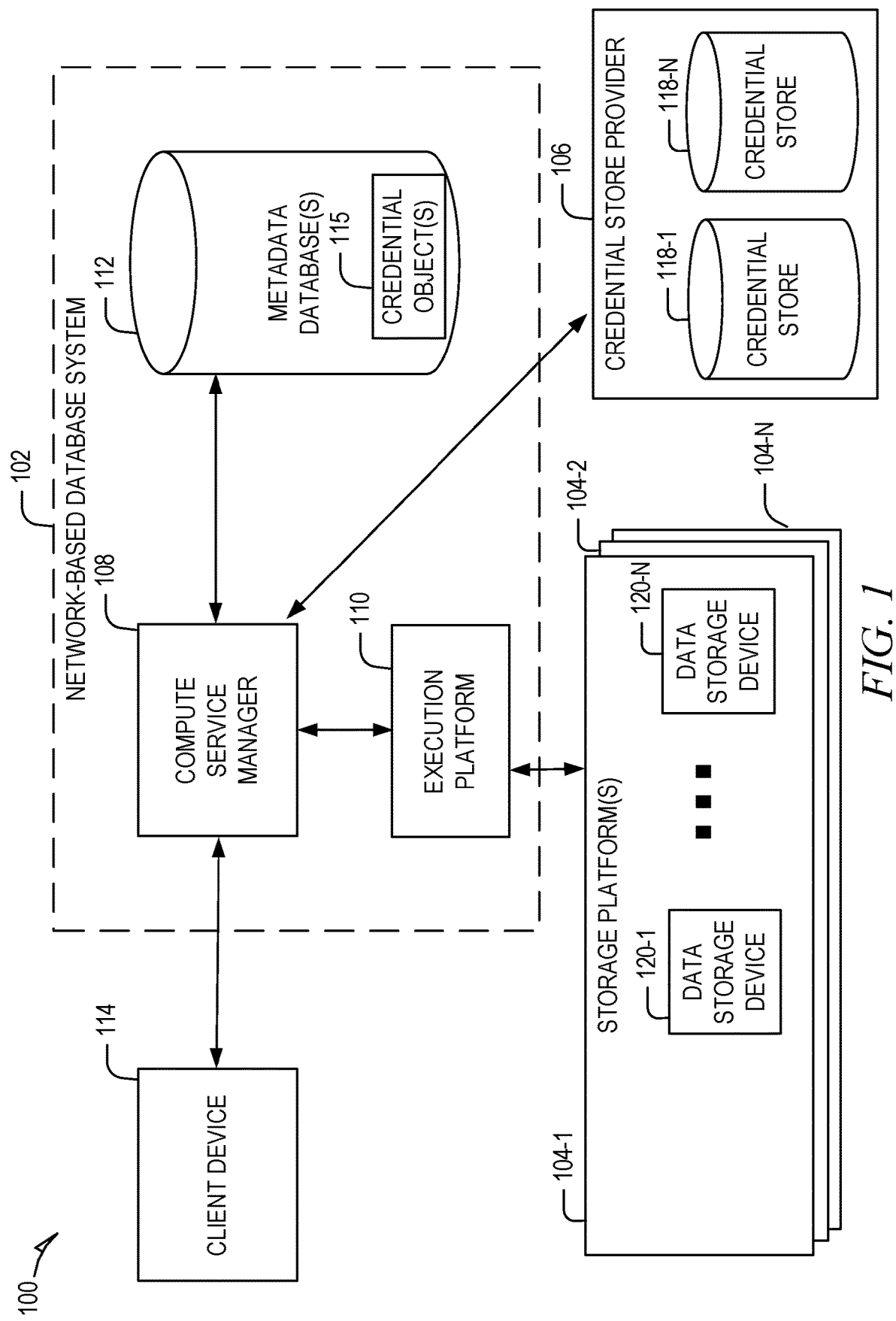
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

There exist multiple architectures for traditional database systems and cloud database systems. One example architecture is a shared-disk system. In the shared-disk system, all data is stored on a shared storage device that is accessible from all processing nodes in a data cluster. In this type of system, all data changes are written to the shared storage device to ensure that all processing nodes in the data cluster access a consistent version of the data. As the number of processing nodes increases in a shared-disk system, the shared storage device (and the communication links between the processing nodes and the shared storage device) becomes a bottleneck slowing data read and write operations. This bottleneck is further aggravated with the addition of more processing nodes. Thus, existing shared-disk systems have limited scalability due to this bottleneck problem.

The subject technology enables replication of database data in multiple locations or on multiple storage devices. In an example, replicating data can safeguard against system failures that may render data inaccessible over a cloud network and/or may cause data to be lost or permanently unreadable. Replicating database data can provide additional benefits and improvements as disclosed herein.

Databases can store enormous sums of data in an organized manner for providers and clients across a networked environment. For example, a provider can store data for a number of clients in a same database. When the clients are in different geographical regions, the database may need to be replicated to provide access to the data to the clients. Replicating entire databases across the networked environment can be costly and cause much latency due to the size of the databases. Accordingly, there is a need to replicate the relevant portions of the database to different regions.

Among other things, embodiments described in the present disclosure improve the functionality of a network-based database system by implementing share-based database replication in the network. Using the share-based replication, the network-based database system reduces the replication costs and replication latency by filtering away most objects that are not required for the share to function correctly.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104-1 (e.g., AWS S3®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104-1. The cloud storage platform 104-1 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104-1) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one or more security credentials to be retrieved by the compute service manager 108 from one of the remote credential stores 118-1 to 118-N (e.g., for use in accessing data stored by the storage platform 104-1).

The compute service manager 108 is further coupled to the execution platform 110, which provides multiple computing resources that execute various data storage and data retrieval tasks. The execution platform is coupled to one of the storage platforms (e.g., storage platform 104-1, storage platform 104-2, storage platform 104-N). The storage platform 104-1 comprises multiple data storage devices 120-1 to 120-N, and each other storage platform can also include multiple data storage devices. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems or any other data storage technology. Additionally, the storage platform 104 may include distributed file systems (such as Hadoop Distributed File Systems (HDFS)), object storage systems, and the like. Similarly, any of the data storage devices in other storage platforms as discussed further herein can also have similar characteristics described above in connection with storage platform 104-1.

In an embodiment, each storage platform can provide a different domain or type of storage. For example, storage platform 104-1 may provide storage for a database that stores tables using micro-partitions as discussed further herein, and storage platform 104-2 may provide storage for linearizable storage corresponding to a distributed database (e.g., FoundationDB) that stores tables in a key-value format. Thus, in an implementation, different storage platforms can be utilized for cross domain transactions against different types of databases as discussed further below. In another embodiment, the same storage platform can be utilized for such cross domain transactions where different data storage devices (e.g., data storage device 120-1 and data storage device 120-N) can be utilized for a first type of database (database tables based on micro-partitions) and a second type of database (e.g., linearizable storage tables).

As shown in FIG. 1, the data storage devices 120-1 to 120-N are decoupled from the computing resources associated with the execution platform 110. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104-1, are shown in FIG. 1 as individual discrete components. However, each of the compute service manager 108, metadata database(s) 112, execution platform 110, and storage platform 104-1 may be implemented as a distributed system (e.g., distributed across multiple systems/platforms at multiple geographic locations). Additionally, each of the compute service manager 108, metadata database(s) 112, execution platform 110, and storage platform 104-1 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104-1. It is desirable to retrieve as much data as possible from caches within the execution platform 110 because the retrieval speed is typically much faster than retrieving data from the cloud storage platform 104-1.

In embodiments, the compute service manager 108 is also coupled to one or more metadata databases 112 that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage.

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enables the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

As shown in FIG. 1, the computing environment 100 separates the execution platform 110 from the storage platform 104-1. In this arrangement, the processing resources and cache resources in the execution platform 110 operate independently of the data storage devices 120-1 to 120-N in the cloud storage platform 104-1. Thus, the computing resources and cache resources are not restricted to specific data storage devices 120-1 to 120-N. Instead, all computing resources and all cache resources may retrieve data from, and store data to, any of the data storage resources in the cloud storage platform 104-1.

Figure 2:
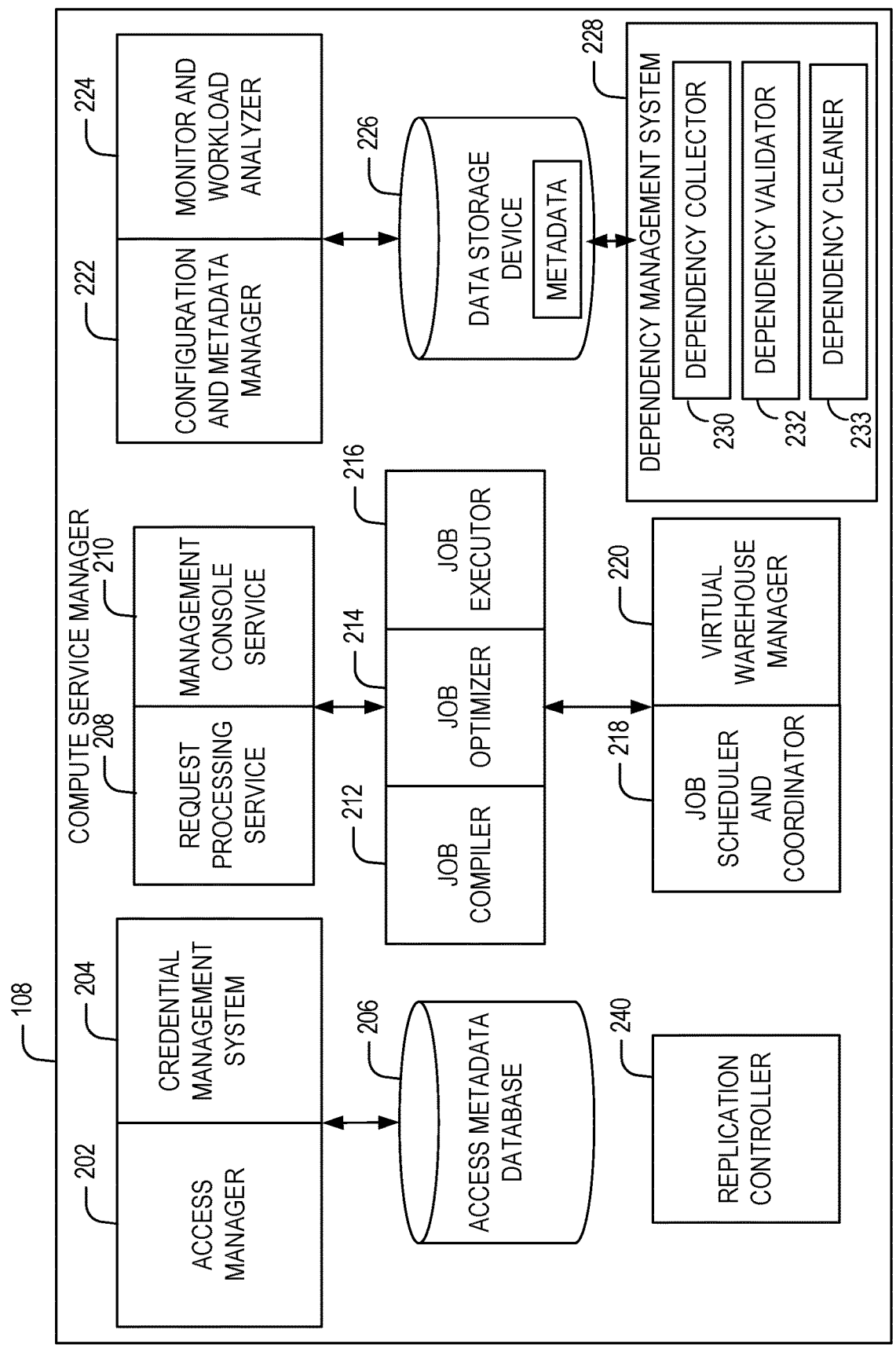
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104-1.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104-1) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104-1, or any other storage device.

A dependency management system 228 of the compute service manager 108 is responsible for managing object dependencies within network-based database system 102. The dependency management system 228 includes a dependency collector 230, a dependency validator 232, and a dependency cleaner 233. The dependency collector 230 monitors DDL operations performed within network-based database system 102 to detect creation of object dependencies. The dependency collector 230 generates a dependency record for each detected object dependency. Each dependency record includes dependency information that describes the object dependency. A dependency record can, for example, include any one or more of: an identifier of the referenced object (e.g., an object name or other unique identifier), a parent database of the referenced object, a parent schema of the referenced object, a domain of the referenced object, an identifier of the referencing object (e.g., an object name or other unique identifier), a parent database of the referencing object, a parent schema of the referencing object, and a domain of the referencing object. Dependency records are maintained in one or more metadata repositories of network-based database system 102, which can be included in the data storage device 226.

In addition, each dependency record can include an indication of a validity status for the corresponding object dependency. The status of an object' dependency can be valid or broken (invalid). Accordingly, a dependency record includes an indicator of the dependency being valid or broken. The dependency validator 232 is responsible for assessing the validity of object dependencies and maintaining an accurate status in corresponding dependency records. That is, the dependency validator 232 can change the status of a dependency record based on detecting a change to the status of the underlying dependency.

The dependency cleaner 233 is responsible for ensuring that the dependency information maintained in dependency records is up to date. In some instances, the dependency cleaner 233 can remove a dependency record from the database of dependency if the dependency record is no longer relevant to ongoing operations. Further details regarding the components of the dependency management system 228 are discussed below.

As shown in FIG. 2, the compute service manager 108 includes a replication controller 240 that implements database replication or sub-database replication, according to some embodiments. Replication controller 240 works in conjunction with dependency management system 228 as part of a share-based replication process as discussed further herein.

Figure 3:
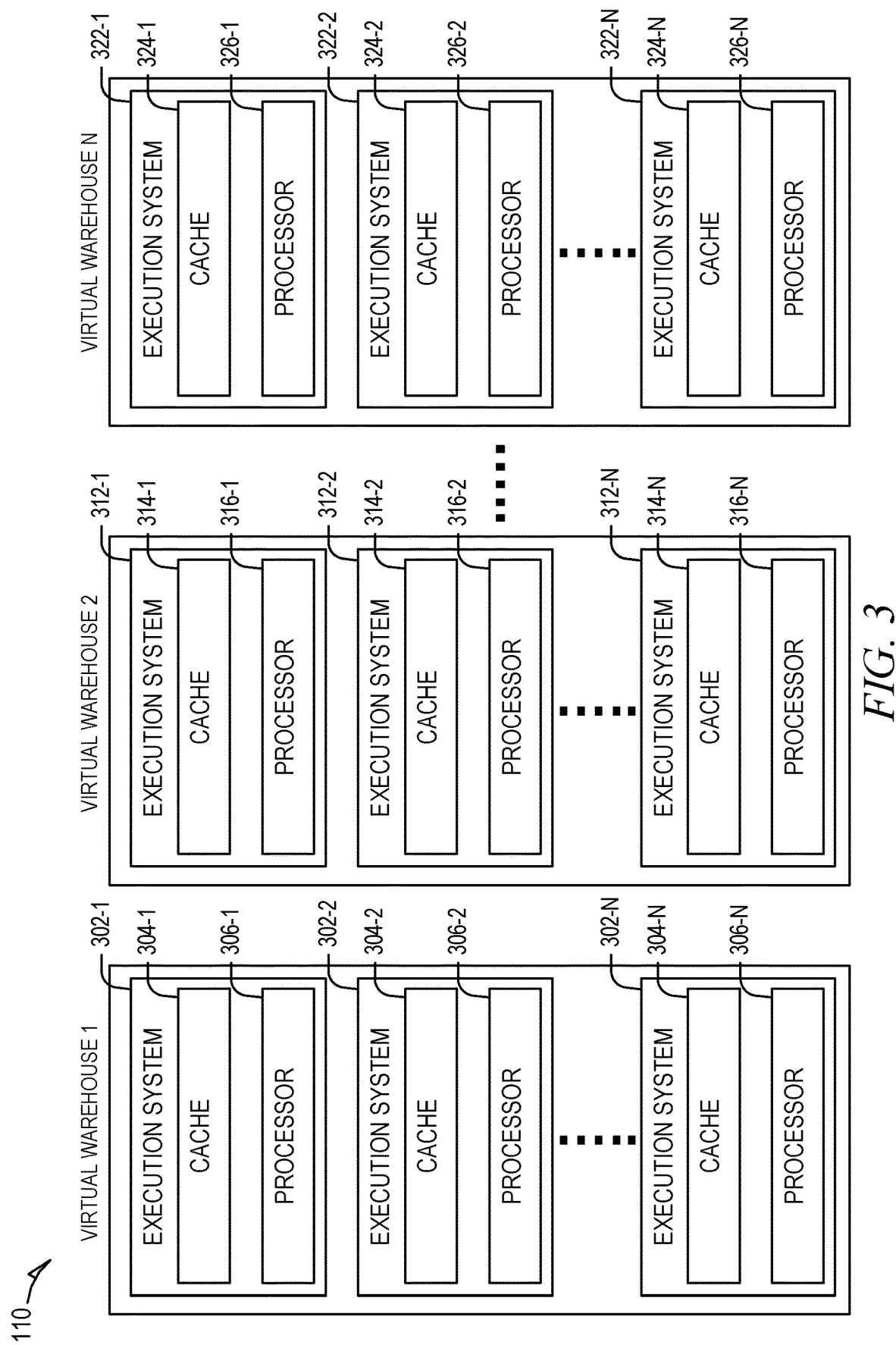
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104-1).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104-1. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104-1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104-1.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104-1, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
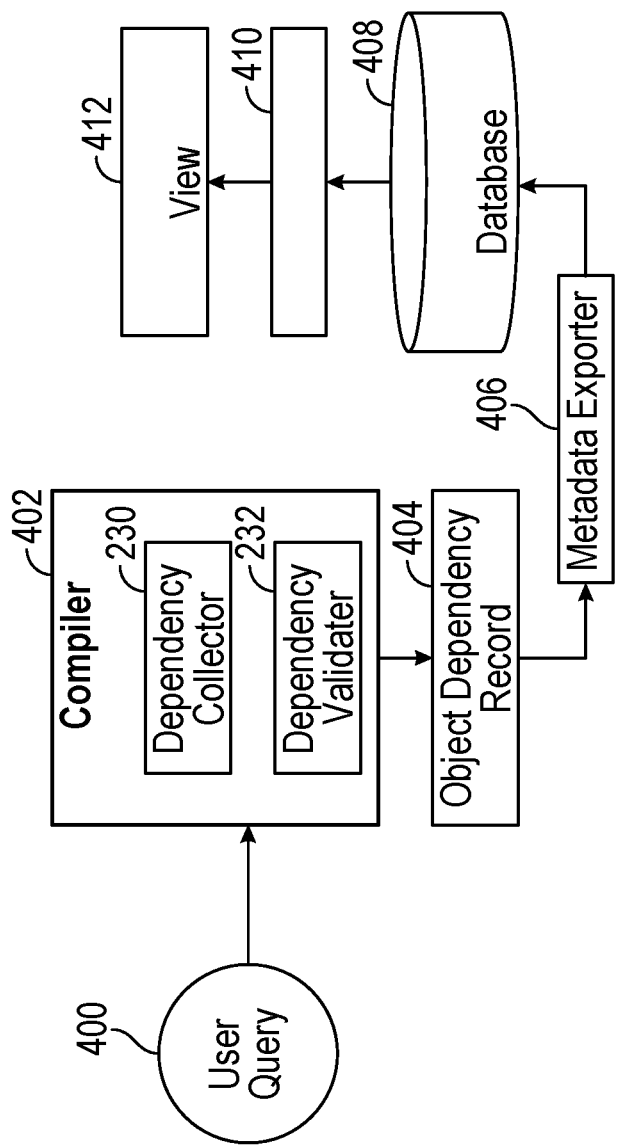
FIG. 4 is a flow diagram illustrating aspects of the dependency management system in tracking object dependencies in network-based database system 102, in accordance with some embodiments of the present disclosure.

FIG. 4 is a flow diagram illustrating aspects of the dependency management system 228 in tracking object dependencies in network-based database system 102, in accordance with some embodiments of the present disclosure. As shown, a user query 400 is received by a compiler 402 of the compute service manager 108. The query 400 includes a command to create a first object (hereinafter referred to as a "referencing object") with a dependency on a second object (hereinafter referred to as a "referenced object").

There are multiple types of object dependencies within the context of network-based database system 102. For example, there are direct dependencies, by-Name object dependencies, and by-identifier object dependencies. With a direct dependency, a first object depends directly on a second object. With a by-Name object dependency, a first object refers to a second object by name. A by-Name dependency can depend on a database, schema, object name, or combinations thereof depending on whether the specified name is fully qualified ("x.y.z"), partially qualified ("y.z"), or unqualified ("z"). Examples of by-Name object dependencies include view and user defined function definitions that refer to a source table. As a more specific example of by-Name object dependency, a view V can be created by the following statement:

CREATE VIEW V AS SELECT*FROM Sch.T;

These types of dependencies are specified by the partial/full qualified name of the referenced object in the referencing object's definition where the definition is a SQL expression. Objects such as views, policies, functions, and procedures are examples that fall into this category.

With a by-ID dependency, a referencing object stores an identifier of a referenced object as a dependency. Generally, this dependency is stored as a specific field in metadata of the referencing object that stores the ID of the referenced object. As an example, an external table with a by-ID dependency on a stage includes an identifier of the stage in a specific field of the metadata for the table.

As shown in FIG. 4, the dependency collector 230 works in conjunction with the compiler 402 and detects the object dependency created based on the command. The dependency validator 232 analyzes the object dependency to determine a state of the dependency. More specifically, the dependency validator 232 determines whether the dependency is valid or invalid (also referred to herein as "broken"), which are two possible states for an object dependency. The dependency collector 230 creates a dependency record 404 based on the detected object dependency and the state of the dependency.

A metadata exporter 406 of the compute service manager 108 exports the dependency record 404 to a dependency record database 408. The dependency record database 408 can store multiple dependency records for multiple objects maintained by network-based database system 102. A dependency table 410 can be created from a set of dependency records within the dependency record database 408. An object dependency view 412 can be created from the table 410 to present dependency information for one or more objects. In an example, the object dependency view 412 corresponds to a specific object and provides dependency information for the object that specifies dependencies of the objects, dependencies on the object, or a combination of both.

Figure 5:
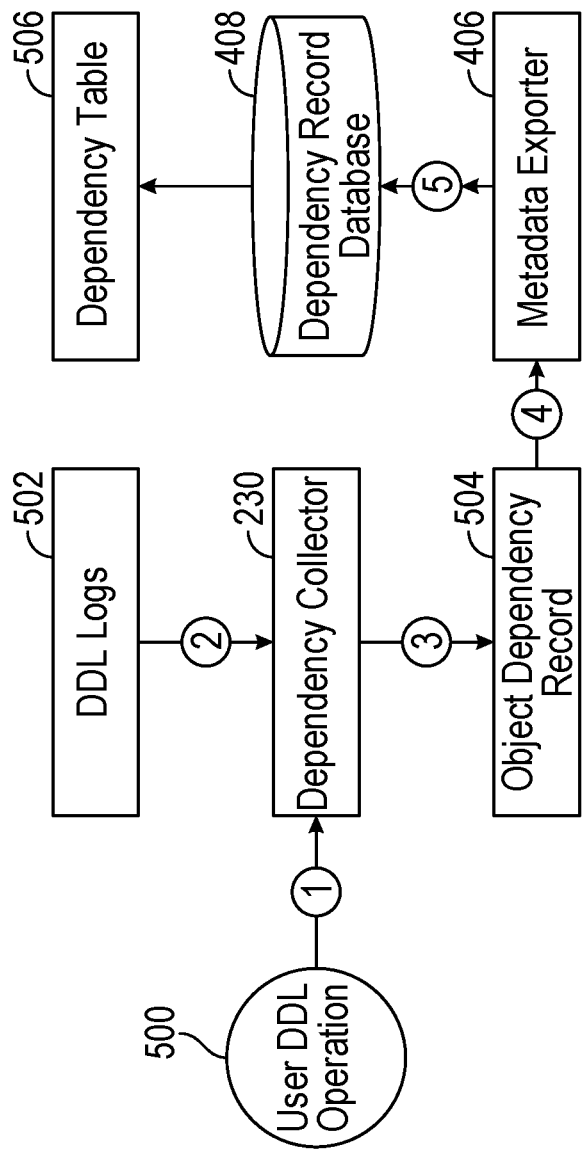
FIG. 5 is a flow diagram illustrating aspects of the dependency management system in tracking object dependencies in network-based database system 102, in accordance with some embodiments of the present disclosure.

FIG. 5 is a flow diagram illustrating aspects of the dependency management system 228 in tracking object dependencies in network-based database system 102, in accordance with some embodiments of the present disclosure. As shown, a user performed DDL operation 500 (e.g., create, drop, or update) is logged and included in DDL logs 502. The DDL operation results in the creation of an object dependency. The dependency collector 230 analyzes the DDL logs 502 and identifies the object dependency created based on the DDL operation 500. Based on the detected object dependency, the dependency collector 230 generates a dependency record 504 and stores the dependency record 504 in an intermediate database used to store records before exporting them to the dependency record database 408. The metadata exporter 406 periodically accesses the dependency records from the intermediate database and exports the records to the dependency record database 408. A table 506 can be created from a set of dependency records within the dependency record database 408.

Figure 6:
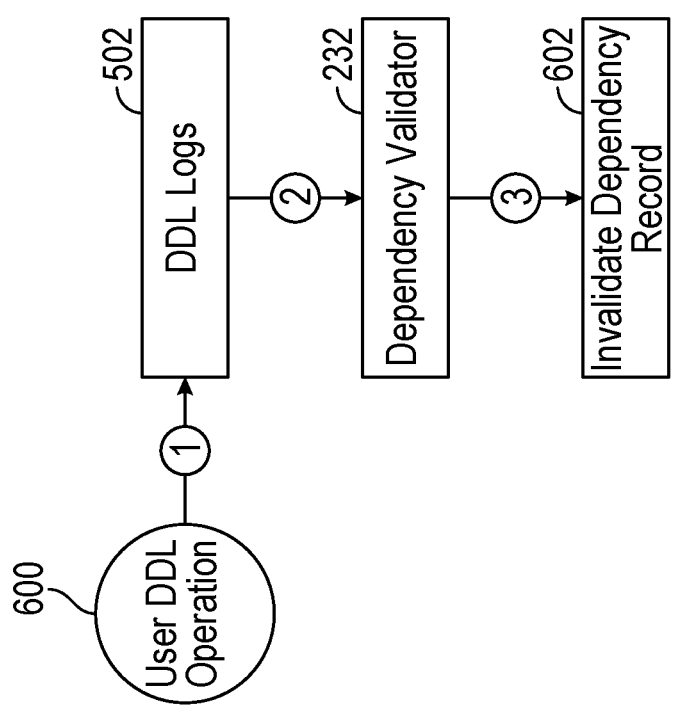
FIG. 6 is a flow diagram illustrating aspects of the dependency management system in tracking object dependencies in network-based database system 102, in accordance with some embodiments of the present disclosure.

FIG. 6 is a flow diagram illustrating aspects of the dependency management system 228 in tracking object dependencies in network-based database system 102, in accordance with some embodiments of the present disclosure. As shown, a user performs a DDL operation 600 (e.g., create, drop, or update) on a first object with an existing dependency on a second object. The DDL operation 600 results in a change to either the first or second object. The DDL operation 600 is logged and added to the DDL logs 502. The dependency validator 232 accesses the DDL log 502 and detects the change to the first or second object resulting from the DDL operation 600. The dependency validator 232 analyzes whether the change results in the object dependency between the first and second object being broken (invalid). Based on determining that the change results in the object dependency being invalid, the dependency validator 232 invalidates the corresponding dependency record, at 602. In doing so, the dependency validator 232 changes the state of the dependency indicated in the dependency record from "valid" to "broken."

Figure 7:
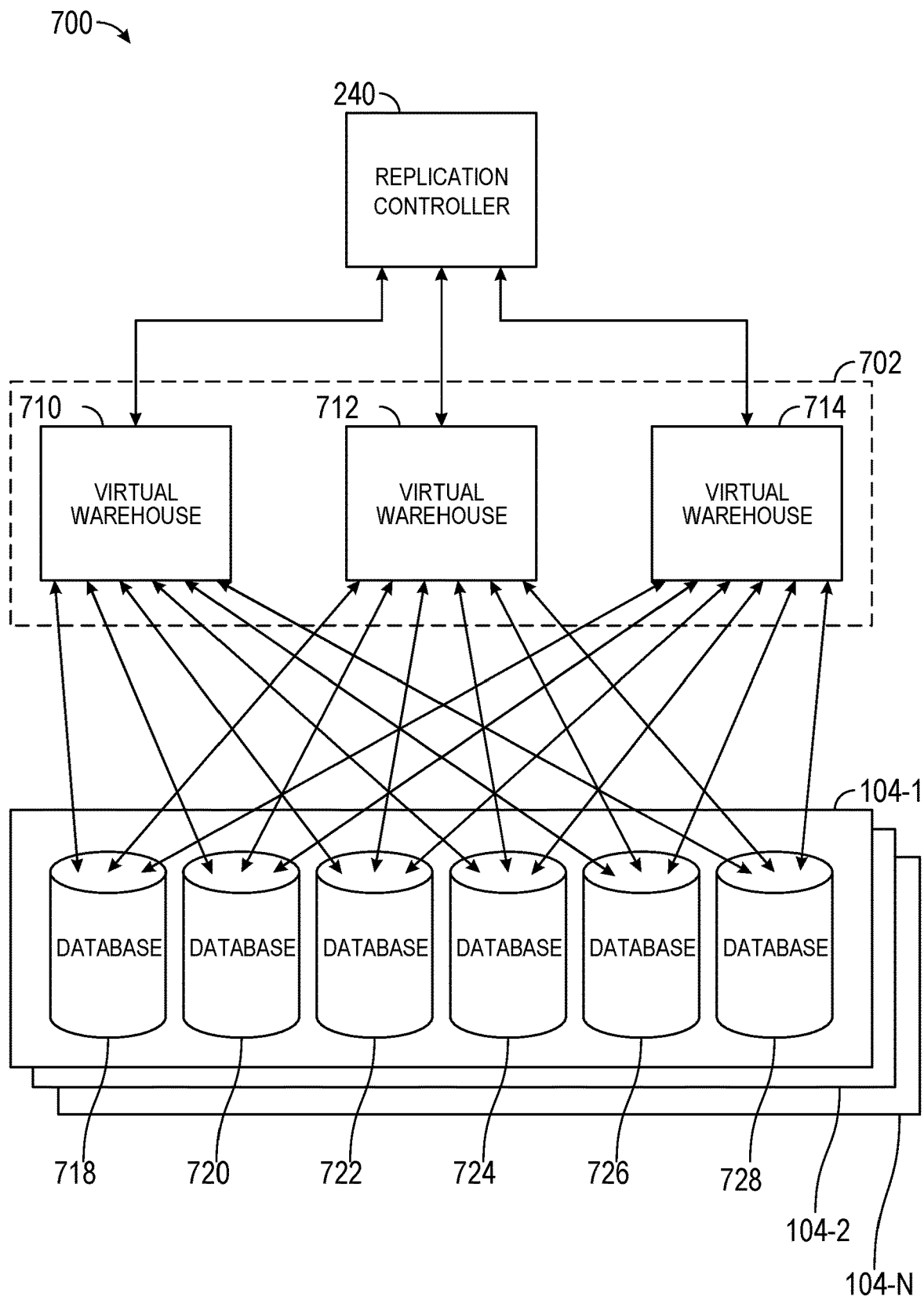
FIG. 7 is a block diagram depicting an embodiment of an computing environment with a replication controller accessing multiple databases and multiple virtual warehouses contained in a virtual warehouse group.

FIG. 7 is a block diagram depicting an embodiment of an computing environment 700 with a replication controller accessing multiple databases and multiple virtual warehouses contained in a virtual warehouse group. Environment 700 includes a replication controller 240 and multiple virtual warehouse 710, virtual warehouse 712, and virtual warehouse 714 arranged in a virtual warehouse group 702. In particular, multiple users can access storage platform 104-1 including database 718, database 720, database 722, database 724, database 726, and database 728 through replication controller 240 and virtual warehouse group 702. Although not shown, it is understood that storage platform 104-2 to storage platform 104-N can include any number of databases similar to storage platform 104-1, which multiple users can also access through replication controller 240. Moreover, additional virtual warehouse groups can be provided to access such databases included in storage platform 104-2 to storage platform 104-N. In some embodiments, users can access replication controller 240 through compute service manager 108.

Users may submit data retrieval and data storage requests to replication controller 240, which routes the data retrieval and data storage requests to an appropriate virtual warehouse in virtual warehouse group 702. In some implementations, replication controller 240 provides a dynamic assignment of users to virtual warehouses. When submitting a data retrieval or data storage request, users may specify a particular virtual warehouse group to process the request. This arrangement allows replication controller 240 to distribute multiple requests across the virtual warehouses based on efficiency, available resources, and the availability of cached data within the virtual warehouses. When determining how to route data processing requests, replication controller 240 considers available resources, current resource loads, number of current users, and the like.

In some embodiments, fault tolerance systems create new virtual warehouses in response to a failure of a virtual warehouse. The new virtual warehouse may be in the same virtual warehouse group or may be created in a different virtual warehouse group at a different geographic location.

As illustrated, each virtual warehouse is configured to communicate with any (or all) of database 718, database 720, database 722, database 724, database 726, and database 728.

In an embodiment, each virtual warehouse can be configured to communicate with only a subset of database 718, database 720, database 722, database 724, database 726, and database 728. For example, in computing environment 700, virtual warehouse 710 can be configured to communicate with database 718, database 720, and database 722. Similarly, virtual warehouse 712 can be configured to communicate with database 720, database 724, and database 726. And, virtual warehouse 714 can be configured to communicate with database 722, database 726, and database 728.

Although computing environment 700 shows one virtual warehouse group 702, alternate embodiments may include any number of virtual warehouse groups, each associated with any number of virtual warehouses. For example, different virtual warehouses may be created for each customer or group of users, and for virtual warehouses in different regions. Additionally, different virtual warehouses may be created for different entities, or any other group accessing different data sets. Multiple virtual warehouse groups may have different sizes and configurations. The number of virtual warehouse groups in a particular environment is dynamic and may change based on the changing needs of the users and other systems in the environment.

Figure 8:
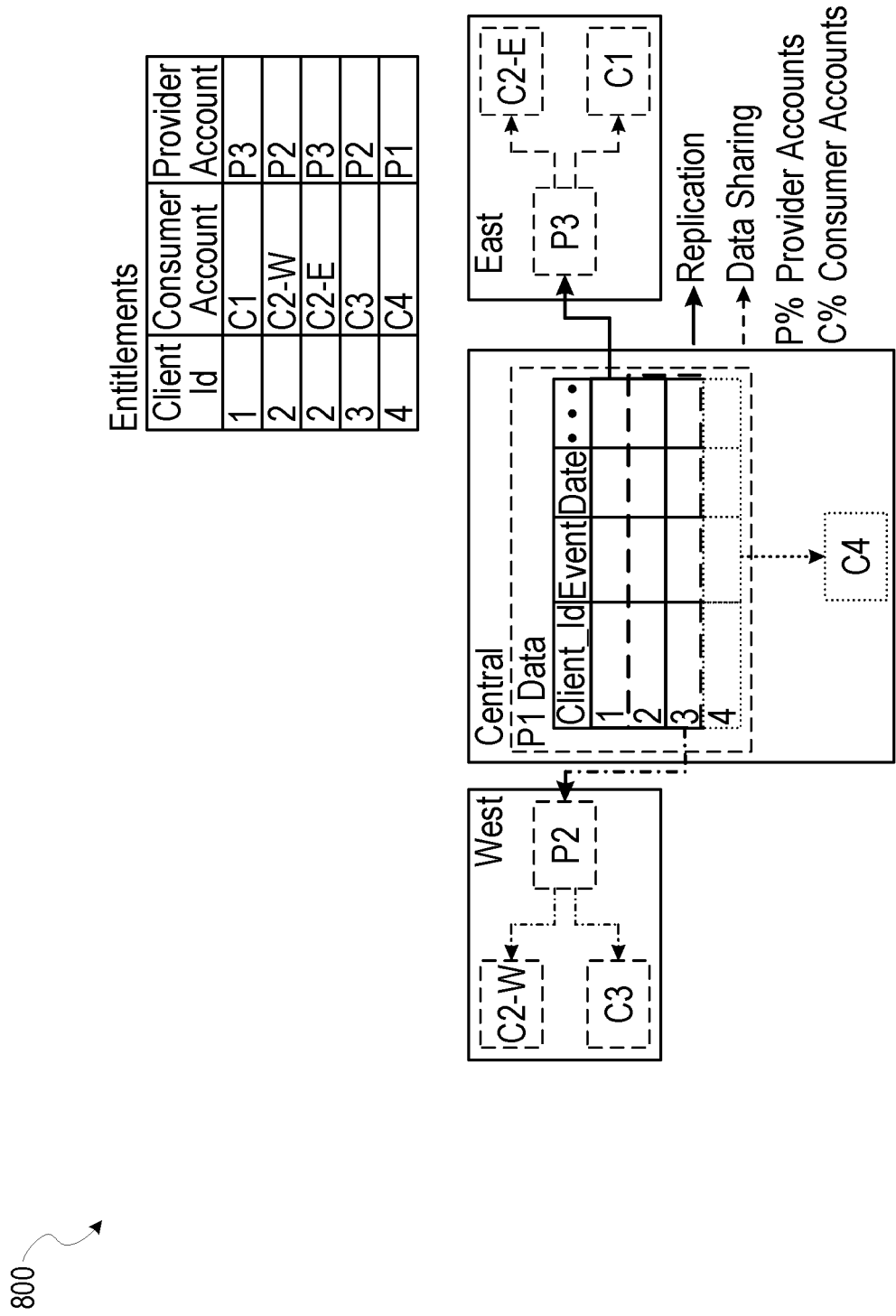
FIG. 8 illustrates a diagrammatic representation of the replication controller implementing sub-table replication, in accordance with some examples.

FIG. 8 illustrates a diagrammatic representation 800 of the replication controller 240 implementing sub-table replication, in accordance with some examples. In this embodiment, the replication controller 240 replicates the subset of table rows that are needed to be shared in a given region to the provider account in that region. For example, the replication controller 240 selects and replicates the subset of table rows (client_id 2, 3) that are needed to be shared to consumers (e.g., C3 and C2-W) to the provider account P2 in the West region. Similarly, the replication controller 240 selects and replicates the subset of table rows (client_id 1, 2) that are needed to be shared to consumers (e.g., C1 and C2-E) to the provider account P3 in the East region.

Selecting the rows from the data table to be replicated is challenging because data in the primary data table can be materialized as contiguous units of storage called micro-partitions. The table can be a collection of micro-partitions.

Each micro-partition is a file that contains uncompressed data. The size of the micro-partition can be equal or less than 16 megabytes (MB) in an implementation. Groups of rows in the table can be mapped into individual micro-partitions organized in columns.

Further, using a data manipulation language (DML), changes can be made to the data in the data table. In some implementations, changes may be made by way of any DML statement. Examples of manipulating data may include, but are not limited to, selecting, updating, changing, merging, and inserting data into tables. When new data is inserted, compute service manager 108 creates a new micro-partition. When data is updated, compute service manager 108 marks the micro-partition storing the data for deletion and creates a new micro-partition for the updated data.

Given that many rows in a table are packed into these micro-partitions, in one embodiment, to perform row-level filtering, the replication controller 240 opens each micro-partition to review whether the rows therein are to be replicated for the different regions. This row-level filtering allows for precision but causes a slowdown in the replication.

The following discussion relates to providing share-based sub-database replication. As referred to herein, share-based replication relates to replication of objects including tables, external tables, views, materialized views, UDFs, UDTFs, streams, and the like. Such objects are stored in a portion(s) of a database(s) (e.g., hence "sub-database"). A "share" therefore is any named object that includes information required to share a database or a set of objects stored within the database. In an implementation, metadata associated with a share includes:
The privileges that grant access to the database(s) and the schema containing the objects to share.
The privileges that grant access to the specific objects in the database.
The accounts with which the database and its objects are shared.

In some existing solutions, a database was utilized as an atomic unit of replication. In such solutions, database replication involved replication of the entire primary database to a secondary database. The main disadvantages of replicating an entire database include high cost and latency associated with replicating a large database in its entirety. Examples of costs include computation costs, network transfer costs, and long-term storage costs, and the like. Further, the users are not provided the opportunity to minimize their costs and latency by selecting or excluding objects in the database for replication. For example, some users want to exclude objects from their database from replication.

In practical terms and for resolving the disadvantages mentioned above, databases were split into smaller chunks so that only the necessary data was replicated across regions, thereby reducing the cost of replication. However, manual identification of which tables that are included in a share was performed, and those tables were required to be kept in a single database, which increased the effort and overhead to organize the tables in such a manner.

The subject system (e.g., the replication controller 240 and dependency management system 228) resolves the previous requirement of manual identification of data and storing the identified data in a single database. Moreover, the replication controller 240 (or dependency management system 228) identifies a minimum amount of data and metadata that are utilized to enable a share to work, and this reduction in volume of data and metadata results in faster replication at lower costs.

Sub-database replication of shares enables users to specify a list of shares in a replication group definition, and the replication controller 240, working in conjunction with dependency management system 228, determines the set of entities that need to be replicated for those shares to work. In an implementation, computation of this set starts from the entities that the share has grants on, and then uses a combination of parent-child relationships and the object dependencies framework to figure out a transitive closure of dependencies. This set is typically a much smaller subset of what a full-database replication entails.

The following discussion relates to syntax and user flows for sub-database replication.

The following are example code statements enable replication of data with dependencies:

```
primary> create view db1.sch1.v1 as (select * from
    db1.sch2.v2);
primary> create share sh1;
primary> grant usage on database db1 to share sh1;
primary> grant select on view v1 to share sh1;
primary> create replication group RG
    object_types = SHARES WITH DEPENDENCIES
    allowed_shares = SH1
    allowed_accounts = region1.account1
    replication_schedule = '15 MINUTES'
secondary> create replication group RG as replica of
    region.account.RG;
```

Another example of code statements include the following:

```
create replication group RG
    object_types = SHARES WITH DEPENDENCIES
    allowed_shares = SH1
    allowed_accounts = region1.account1
```

In the above examples, the code statements create a replication group of objects including all of the dependencies, which is then replicated. To determine dependencies between different objects, the subject technology can perform operations which are discussed further herein.

As part of compiling a query for performing replication, the subject system (e.g., dependency management system 228) determines a set of dependencies and stores metadata associated with the set of dependencies into a database (e.g., internal tracking database, and the like). A dependency graph is generated as part of compiling the query, which can be represented as a tree data structure including a set of nodes corresponding to different objects and their dependencies configured in a hierarchical order. Starting from a root node of this tree structure, a set of structural and logical dependencies are determined for each node, and the tree structure is traversed until finally reaching the leaf nodes of the tree structure. Although a tree structure is used, as discussed in more detail below in FIG. 9, this tree structure can include more than one root node (e.g., corresponding to different share objects) and therefore is referred herein as a graph structure instead.

The following discussion relates to example constraints. Replication group operations for CRUD (create, read, update and delete) enforces a set of constraints during create/alter-set/alter-move operations. In another example, constraints can also be provided for alter-add and alter-remove to add and remove a share to/from a replication group. In addition, there are also alter-add-allowed-accounts and alter-remove-allowed-accounts to add and remove allowed accounts where constraints can be applied.

Constraints

1. No two replication groups having the same target account (e.g., allowed account) can have overlapping members.
2. One member can be part of multiple replication groups as long as they have different target accounts (e.g., allowed accounts).
3. If a member is part of a failover group, then it cannot be part of any other replication group or failover group.
4. A share/database can only be refreshed by one replication group (RG) in the secondary account.

The following relates to a control flow of share based replication. To ensure that the pre-existing RG constraints (as discussed before) are not violated, the replication controller 240 continually tracks in metadata database 112 the share's underlying database (e.g., the database that the share has usage rights on) as an inferred member of the replication group, even though the user did not explicitly make the database a member of the RG.

In an implementation, since a share's underlying DB is set up/modified via a grant usage on a DB to share object, the replication controller 240 ensures that grants/revokes of usage on the DB to share object will:

1. validate that no constraint is getting violated
2. update the metadata database 112 to track additions and removals of dependencies The following discussion relates to a data flow of share based replication.

Figure 9:
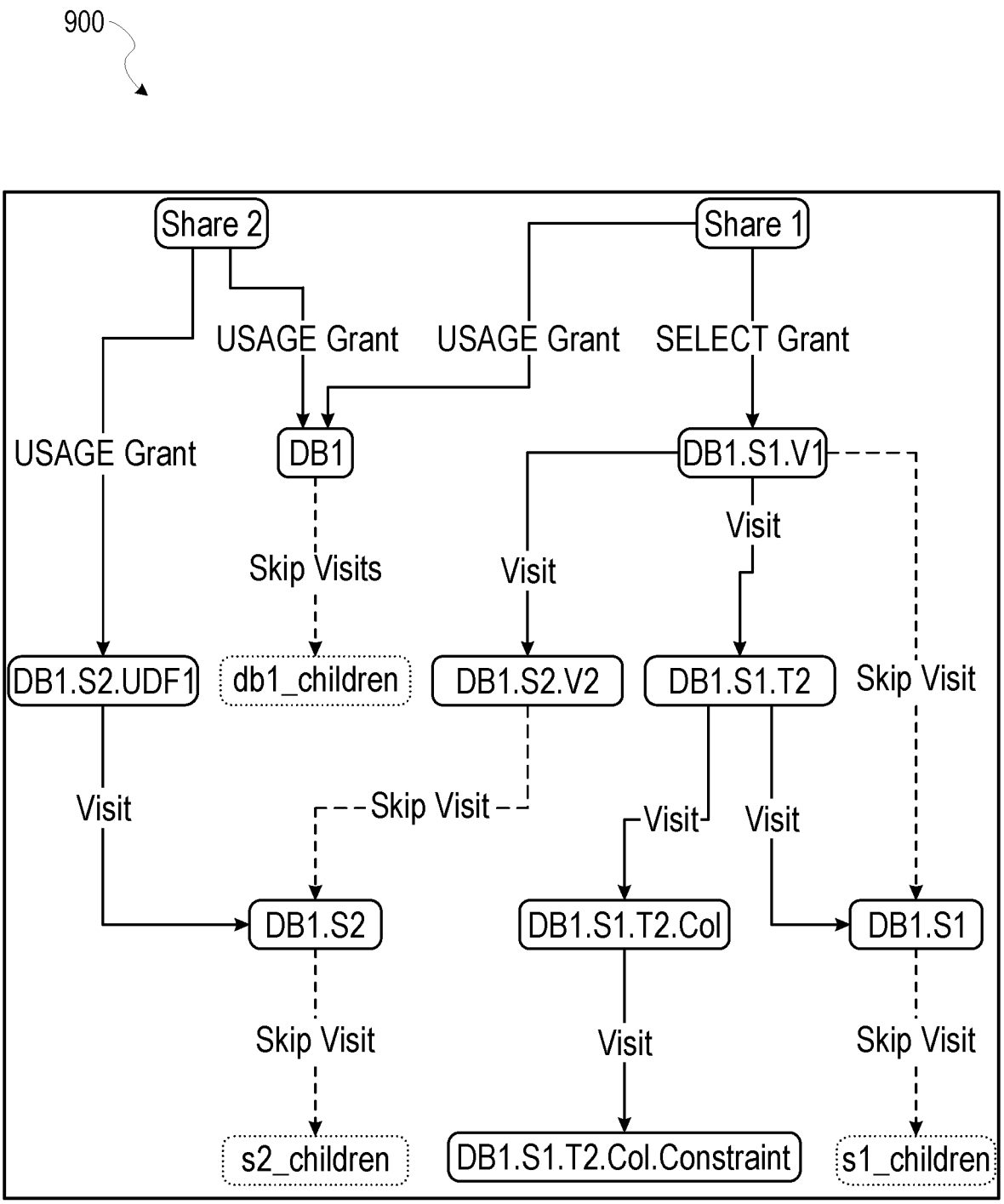
FIG. 9 illustrates a traversal of an example of a dependency graph for a replication group, in accordance with embodiments of the subject technology

FIG. 9 illustrates a traversal of an example of a dependency graph 900 for a replication group, in accordance with embodiments of the subject technology.

In the example of FIG. 9, dependency graph 900 corresponds to a replication group including share 1 (e.g., first set of objects) and share 2 (e.g., second set of objects). In an embodiment, replication controller 240 determines that share 1 and share 2 are included in the replication group and includes respective root nodes for share 1 and share 2 in dependency graph 900.

In this example, replication controller 240 begins a traversal of dependency graph 900, which includes a set of nodes, and finds Share 1 and Share 2, each of which representing a particular share (e.g., as discussed and defined previously). In the discussion below, replication controller 240 visits Share 2 and subsequently visits Share 1. However, it is appreciated that in an alternative embodiment, replication controller 240 visits Share 1 and subsequently visits Share 2. In addition, in another embodiment, replication controller 240 visits Share 1 and Share 2 in parallel.

Replication controller 240 visits Share 2 and finds Usage Grant to DB1 (e.g., a first database or database 1) and DB1.S2.UDF1 (e.g., a first user defined function of schema 2 of database 1).

Replication controller 240 skips (e.g., forgoes) a visit to children ("db1_childen") of node DB1 as that would include the whole database in the replication process, thereby defeating the purpose of reduced cost and latency.

(1) Replication controller 240 visits DB1.S2.UDF1 and then visits DB1.S2 (e.g., schema 2 of database 1) as it is the dependency of DB1.S2.UDF1. Replication controller 240 then skips a visit to children ("s2_childen") of DB1.S2 (schema 2 of database 1) as that would include the whole database in the replication process, thereby defeating the purpose of reduced cost and latency.

Replication controller 240 visits Share 1 and finds Usage Grant to DB1 (node of database 1) and Select Grant to DB1.S1.V1 (view 1 of schema 1 of database 1). By way of example, in an implementation, a Select Grant is provided to a table (e.g., "select*from table X"), whereas a Usage Grant is provided to other types of objects (e.g., "use database", "use schema").

Replication controller 240 skips a visit to children ("db1_children") of node DB1 as that would include the whole database in the replication process, thereby defeating the purpose of reduced cost and latency.

Replication controller 240 visits DB1.S1. V1 and finds DB1.S2. V2 (view 2 of schema 1 of database 1), DB1.S1.T2 (table 2 of schema 1 of database 1), and DB1.S1 (schema 1 of database 1) as dependencies of DB1.S1.V1.

Replication controller 240 visits DB1.S2.V2 and finds DB1.S2 (schema 2 of database 1) as a dependency of DB1.S2.V2. Replication controller 240 then skips a visit to DB1. S2 as this node was already visited earlier in (1) described above.

Replication controller 240 visits DB1.S1.T2 (table 2 of schema 1 of database 1) and then finds DB1.S1.T2.Col (column of table 2 of schema 1 of database 1) and DB1.S1 (schema 1 of database 1).

Replication controller 240 visits DB1.S1.T2.Col and then finds DB1.S1.T2.Col.Constraint (constraint of column of table 2 of schema 1 of database 1) as a dependency of DB1.S1.T2.Col and visits this node.

(2) Replication controller 240 visits DB1.S1 and skip a visit to children ("s1_children") of node DB1.S1 as that would include the whole database in the replication process, thereby defeating the purpose of reduced cost and latency.

Returning to DB1.S1.V1, replication controller 240 skips a visit to DB1.S1, as the dependency of DB1.S1.V1, because this dependent node was already visited in (2) described above.

Figure 10:
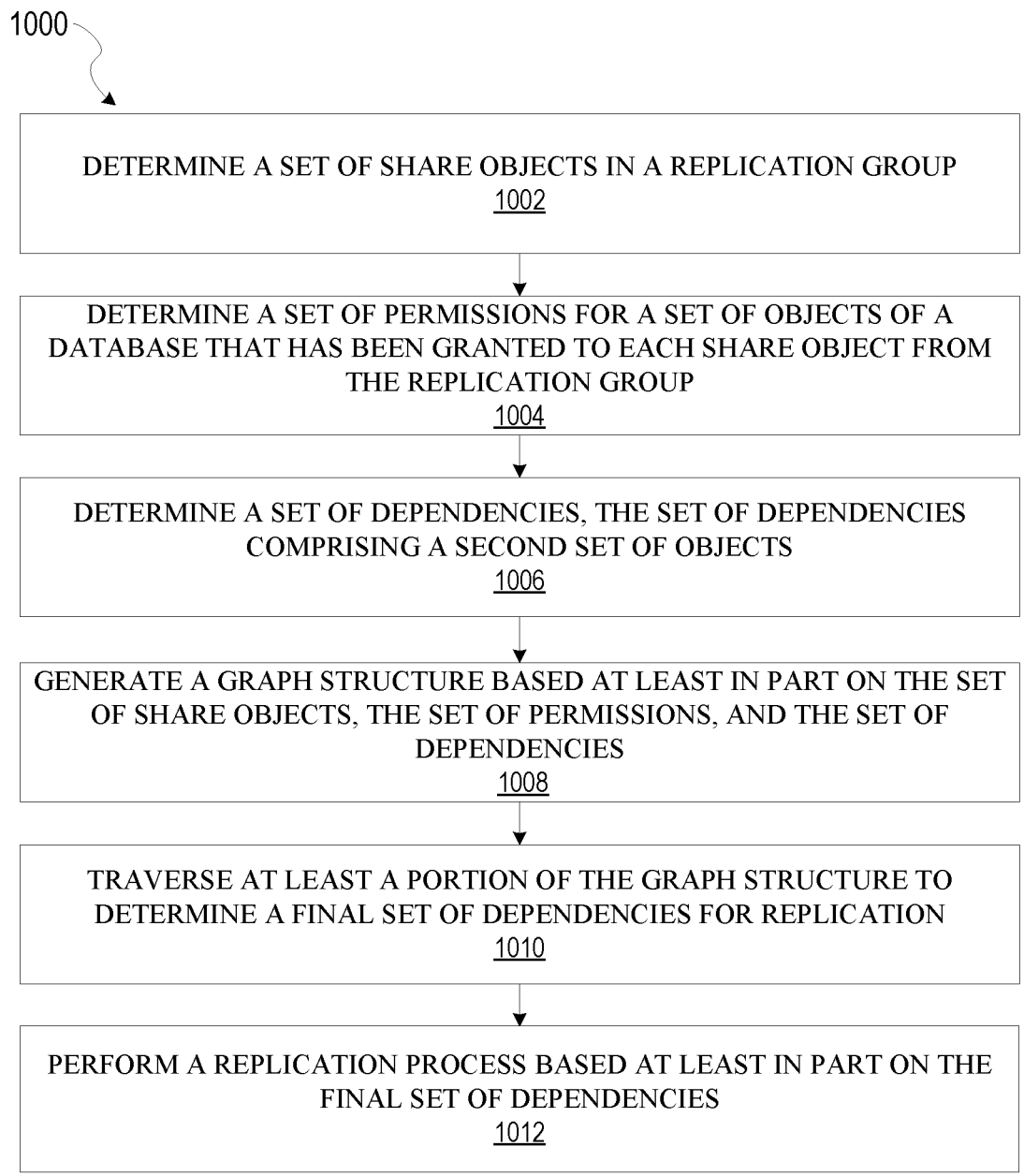
FIG. 10 is a flow diagram illustrating operations of a database system in performing a method, in accordance with some embodiments of the present disclosure.

FIG. 10 is a flow diagram illustrating operations of a database system in performing a method, in accordance with some embodiments of the present disclosure. The method 1000 may be embodied in computer-readable instructions for execution by one or more hardware components (e.g., one or more processors) such that the operations of the method 1000 may be performed by components of network-based database system 102, such as components of the compute service manager 108 or a node in the execution platform 110. Accordingly, the method 1000 is described below, by way of example with reference thereto. However, it shall be appreciated that the method 1000 may be deployed on various other hardware configurations and is not intended to be limited to deployment within the network-based database system 102.

At operation 1002, replication controller 240 determines a set of share objects in a replication group.

At operation 1004, replication controller 240 for each object from the set of share objects, determines a set of permissions for a set of objects of databases that has been granted to each share object from the replication group.

At operation 1006, replication controller 240 for each permission from the set of permissions, determines a set of dependencies, the set of dependencies comprising a second set of objects.

At operation 1008, replication controller 240 generates a graph structure based at least in part on the set of share objects, the set of permissions, and the set of dependencies, the graph structure comprising a set of nodes corresponding to the set of share objects and the set of objects of the database.

At operation 1010, replication controller 240 traverses at least a portion of the graph structure to determine a final set of dependencies for replication.

At operation 1012, the replication controller 240 performs a replication process based at least in part on the final set of dependencies.

In an embodiment, for each object in the second set of objects, replication controller 240 determines a second set of dependencies, where generating the graph structure is further based on the second set of dependencies.

Figure 11:
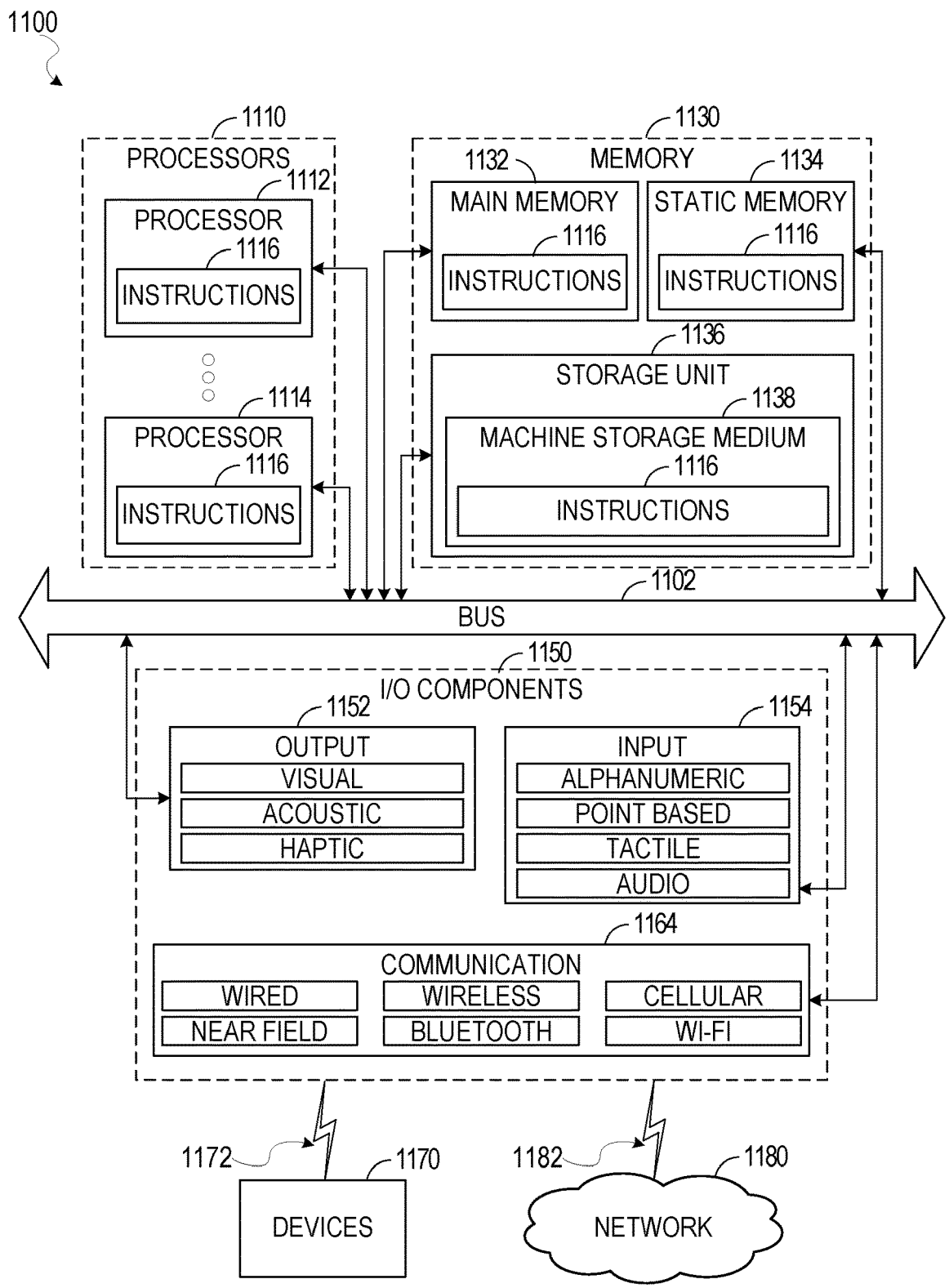
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of the methods described above. As another example, the instructions 1116 may cause the machine 1100 to implement portions of the data flows illustrated herein. In this way, the instructions 1116 transform a general, non-programmed machine into a particular machine 1100 (e.g., the compute service manager 108 or a node in the execution platform 110) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within machine storage medium 1138 of the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the compute service manager 108 or the execution platform 110, and the devices 1170 may include the client device 114 or any other computing device described herein as being in communication with the network-based database system 102 or the cloud storage platform 104-1.

Executable Instructions and Machine Storage Medium

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. The performance of certain of the operations may be distributed among the one or more processors, not only residing within a single machine, but also deployed across a number of machines. In some embodiments, the processor or processors may be located in a single location (e.g., within a home environment, an office environment, or a server farm), while in other embodiments the processors may be distributed across a number of locations.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   determining a set of share objects in a replication group;
   for each object from the set of share objects, determining a set of permissions for a set of objects of databases that has been granted to each share object from the replication group;
   for each permission from the set of permissions, determining a set of dependencies, the set of dependencies comprising a second set of objects;
   generating a graph structure based at least in part on the set of share objects, the set of permissions, and the set of dependencies,
   the graph structure comprising a set of nodes corresponding to the set of share objects and the set of objects of the databases;
   traversing at least a portion of the graph structure to determine a final set of dependencies for replication; and
   performing a replication process based at least in part on the final set of dependencies.

2. The system of claim 1, wherein the operations further comprise:
   for each object in the second set of objects, determining a second set of dependencies, wherein generating the graph structure is further based on the second set of dependencies.

3. The system of claim 1, wherein the set of share objects comprises a first share object and a second share object.

4. The system of claim 3, wherein the operations further comprise:
   determining that the first share object has a usage grant on a first database and a select grant of a first view of the first database.

5. The system of claim 4, wherein the operations further comprise:
   skipping a traversal of a set of child nodes of a parent node corresponding to the usage grant on the first database.

6. The system of claim 4, wherein the operations further comprise:
   determining a particular first set of dependencies based at least in part on the select grant of the first view of the first database, the particular first set of dependencies comprising a second view of the first database associated with a second schema and a second table of the first database associated with the first share object;
   determining a second particular set of dependencies of the second table of the first database associated with the first share object, the second particular set of dependencies comprising a column of the second table, and a first schema of the first database;
   traversing from a particular parent node associated with the second table of the first database to a particular child node associated with the first schema of the first database;
   skipping a traversal from second particular parent node of the first view of the first database to the particular child node associated with the first schema of the first database; and
   determining that the particular child node associated with the first schema of the first database is a particular leaf node of a final graph structure corresponding to the final set of dependencies.

7. The system of claim 6, wherein the operations further comprise:
   determining a third particular set of dependencies of the column of the second table, the third particular set of dependencies comprising a constraint of the column of second table;
   traversing from a third particular parent node of the column of the second table to a second particular child node of the constraint of the column of second table; and
   determining that the second particular child node of the constraint of the column of the second table is a second particular leaf node of the final graph structure based on the constraint of the column of the second table having no dependencies.

8. The system of claim 3, wherein the operations further comprise:
   determining that the second share object has a usage grant on a first database and a second usage grant of a user defined function (UDF) of the first database.

9. The system of claim 8, wherein the operations further comprise:
   determining a particular first set of dependencies based at least in part on the second usage grant of the UDF of the first database, the particular first set of dependencies comprising a second schema of the first database; and
   traversing from a particular parent node of the second usage grant of the UDF of the first database to a particular child node of the second schema of the first database.

10. The system of claim 9, wherein the operations further comprise:
    skipping a traversal of a second particular child node of the second schema of the first database; and determining that the particular child node of the second schema of the first database is a particular leaf node of a final graph structure corresponding to the final set of dependencies.

11. A method comprising:
determining a set of share objects in a replication group;
for each object from the set of share objects, determining a set of permissions for a set of objects of databases that has been granted to each share object from the replication group;
for each permission from the set of permissions, determining a set of dependencies, the set of dependencies comprising a second set of objects;
generating a graph structure based at least in part on the set of share objects, the set of permissions, and the set of dependencies,
the graph structure comprising a set of nodes corresponding to the set of share objects and the set of objects of the databases;
traversing at least a portion of the graph structure to determine a final set of dependencies for replication; and
performing a replication process based at least in part on the final set of dependencies.

12. The method of claim 11, further comprising:
for each object in the second set of objects, determining a second set of dependencies, wherein generating the graph structure is further based on the second set of dependencies.

13. The method of claim 11, wherein the set of share objects comprises a first share object and a second share object.

14. The method of claim 13, further comprising:
determining that the first share object has a usage grant on a first database and a select grant of a first view of the first database.

15. The method of claim 14, further comprising:
skipping a traversal of a set of child nodes of a parent node corresponding to the usage grant on the first database.

16. The method of claim 14, further comprising:
determining a particular first set of dependencies based at least in part on the select grant of the first view of the first database, the particular first set of dependencies comprising a second view of the first database associated with a second schema and a second table of the first database associated with the first share object;
determining a second particular set of dependencies of the second table of the first database associated with the first share object, the second particular set of dependencies comprising a column of the second table, and a first schema of the first database;
traversing from a particular parent node associated with the second table of the first database to a particular child node associated with the first schema of the first database;
skipping a traversal from second particular parent node of the first view of the first database to the particular child node associated with the first schema of the first database; and
determining that the particular child node associated with the first schema of the first database is a particular leaf node of a final graph structure corresponding to the final set of dependencies.

17. The method of claim 16, further comprising:
determining a third particular set of dependencies of the column of the second table, the third particular set of dependencies comprising a constraint of the column of second table;
traversing from a third particular parent node of the column of the second table to a second particular child node of the constraint of the column of second table; and
determining that the second particular child node of the constraint of the column of the second table is a second particular leaf node of the final graph structure based on the constraint of the column of the second table having no dependencies.

18. The method of claim 13, further comprising:
determining that the second share object has a usage grant on a first database and a second usage grant of a user defined function (UDF) of the first database.

19. The method of claim 18, further comprising:
determining a particular first set of dependencies based at least in part on the second usage grant of the UDF of the first database, the particular first set of dependencies comprising a second schema of the first database; and
traversing from a particular parent node of the second usage grant of the UDF of the first database to a particular child node of the second schema of the first database.

20. The method of claim 19, further comprising:
skipping a traversal of a second particular child node of the second schema of the first database; and
determining that the particular child node of the second schema of the first database is a particular leaf node of a final graph structure corresponding to the final set of dependencies.

21. A non-transitory computer-storage medium comprising instructions that, when executed by one or more processors of a machine, configure the machine to perform operations comprising:
determining a set of share objects in a replication group;
for each object from the set of share objects, determining a set of permissions for a set of objects of databases that has been granted to each share object from the replication group;
for each permission from the set of permissions, determining a set of dependencies, the set of dependencies comprising a second set of objects;
generating a graph structure based at least in part on the set of share objects, the set of permissions, and the set of dependencies,
the graph structure comprising a set of nodes corresponding to the set of share objects and the set of objects of the databases;
traversing at least a portion of the graph structure to determine a final set of dependencies for replication; and
performing a replication process based at least in part on the final set of dependencies.

22. The non-transitory computer-storage medium of claim 21, wherein the operations further comprise:
for each object in the second set of objects, determining a second set of dependencies, wherein generating the graph structure is further based on the second set of dependencies.

23. The non-transitory computer-storage medium of claim 21, wherein the set of share objects comprises a first share object and a second share object.

24. The non-transitory computer-storage medium of claim 23, wherein the operations further comprise:
   determining that the first share object has a usage grant on a first database and a select grant of a first view of the first database.

25. The non-transitory computer-storage medium of claim 24, wherein the operations further comprise:
   skipping a traversal of a set of child nodes of a parent node corresponding to the usage grant on the first database.

26. The non-transitory computer-storage medium of claim 24, wherein the operations further comprise:
   determining a particular first set of dependencies based at least in part on the select grant of the first view of the first database, the particular first set of dependencies comprising a second view of the first database associated with a second schema and a second table of the first database associated with the first share object;
   determining a second particular set of dependencies of the second table of the first database associated with the first share object, the second particular set of dependencies comprising a column of the second table, and a first schema of the first database;
   traversing from a particular parent node associated with the second table of the first database to a particular child node associated with the first schema of the first database;
   skipping a traversal from second particular parent node of the first view of the first database to the particular child node associated with the first schema of the first database; and
   determining that the particular child node associated with the first schema of the first database is a particular leaf node of a final graph structure corresponding to the final set of dependencies.

27. The non-transitory computer-storage medium of claim 26, wherein the operations further comprise:
   determining a third particular set of dependencies of the column of the second table, the third particular set of dependencies comprising a constraint of the column of second table;
   traversing from a third particular parent node of the column of the second table to a second particular child node of the constraint of the column of second table; and
   determining that the second particular child node of the constraint of the column of the second table is a second particular leaf node of the final graph structure based on the constraint of the column of the second table having no dependencies.

28. The non-transitory computer-storage medium of claim 23, wherein the operations further comprise:
   determining that the second share object has a usage grant on a first database and a second usage grant of a user defined function (UDF) of the first database.

29. The non-transitory computer-storage medium of claim 28, wherein the operations further comprise:
   determining a particular first set of dependencies based at least in part on the second usage grant of the UDF of the first database, the particular first set of dependencies comprising a second schema of the first database; and
   traversing from a particular parent node of the second usage grant of the UDF of the first database to a particular child node of the second schema of the first database.

30. The non-transitory computer-storage medium of claim 29, wherein the operations further comprise:
   skipping a traversal of a second particular child node of the second schema of the first database; and
   determining that the particular child node of the second schema of the first database is a particular leaf node of a final graph structure corresponding to the final set of dependencies.

* * * * *